UNITED STATES PATENT OFFICE 2,037,371

MONO-ACETOXY-MERCURI-ALKYL-PHENOL-SULPHONIC ACID

Emil Conrad Fanto, Fairfield, and Allen Llewellyn Omohundro, Wilton, Conn., assignors to McKesson & Robbins, Incorporated, Bridgeport, Conn.

No Drawing. Application January 25, 1935, Serial No. 3,388

4 Claims. (Cl. 260—13)

This invention relates to new and highly efficient germicides and antiseptics and the process of making same, but more specifically, the invention contemplates the production of new water-soluble organo-mercuri derivatives of sulphonated mono substituted alkyl phenols, the aliphatic side chain containing from 4 to 9 carbon atoms, and includes the process of making same.

It is a well known fact that the higher homologues of phenol ($C_6H_5OH$) containing the alkyl group in the benzene nucleus are practically insoluble in water. This greatly restricts the use of these powerful germicides for practical purposes, despite the fact that the bactericidal efficiency expressed by the phenol coefficient runs exceedingly high.

In attempting to convert these alkyl phenols into water soluble derivatives by the introduction of the sulphonic acid radical into the nucleus, we confirmed the fact that the sulphonation of alkyl phenols deprives the molecule of bactericidal properties, but we also discovered that the introduction of a mercury group into the nucleus of the mono alkyl phenol sulphonic acids or their salts, restores the high bactericidal efficacy of the alkyl phenols as well as promoting a greater degree of water solubility.

More specifically, the invention relates to mono-acetoxy-mercuri compounds of mono-alkyl-phenol sulphonic acids or their salts, particularly to alkyl phenol sulphonic acids in which an alkyl group of at least four carbon atoms is substituted in the benzene ring. The compounds of the present invention contain the mercury atom bonded to one bond of a carbon atom in the benzene nucleus, and its remaining bond to an acetoxy radical.

The aliphatic hydrocarbon radical, which may be designated as R includes such radicals as:

The butyl radical $C_4H_9$—,
The amyl radical $C_5H_{11}$—,
The hexyl radical $C_6H_{13}$—,
The heptyl radical $C_7H_{15}$—,
The octyl radical $C_8H_{17}$—,
The nonyl radical $C_9H_{19}$—, their isomers or unsaturated hydrocarbon chains such as the allyl radical, but preferably the mono-substituted aliphatic radicals ranging from the butyl to the nonyl series.

The ultimate products included in the present invention would possess the following typical formula:

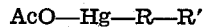

in which AcO represents an acetoxy radical, R an aromatic radical containing one phenol group and a sulphonic acid radical, and R' an alkyl radical, preferably of the paraffin series.

In making these new products, the alkyl phenols are first sulphonated by any of the well known methods of sulphonation and the sulphonated alkyl phenols are obtained either as the free acids or their alkali salts.

To illustrate the present invention, we give below a complete process involving the necessary reactions in obtaining one of the new products. For a condensing medium in the mercuration, we use a mixture of alcohol, water and acetic acid.

Example

To a solution of 2 moles of mercuric acetate in acidified alcohol-water mixture, is added 1 mole of 4-($\beta$-ethyl-hexyl)-phenol-2-sodium sulphonate dissolved in an alcohol-water mixture. The reaction is carried out under reflux for 1–2 hours with the aid of heat not exceeding a temperature of 90° C. The reactions involved take place in the following general manner:

(1) Sulphonation:

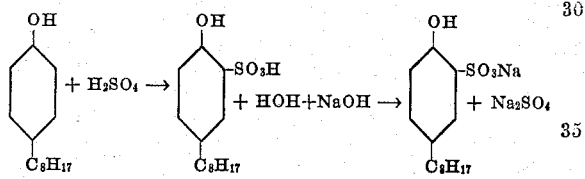

(2) Mercuration:

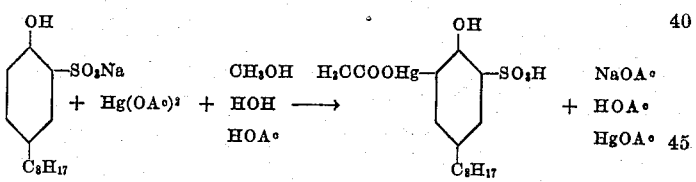

The reaction mixture is allowed to cool and a small amount of insoluble by-product, a diacetoxy mercuri compound of the phenol, is separated by filtration. The 6-acetoxy-mercury-4-($\beta$-ethyl hexyl)-phenol-2-sulphonic acid is obtained from the filtrate by concentration to dryness, purification from acidified alcohol, and drying, preferably in vacuum.

The 6-acetoxy-mercury-4-($\beta$-ethyl hexyl)-phenol-2-sulphonic acid is obtained as a creamy amorphous powder, having no definite melting point. It decomposes at about 200° C. It is insoluble in ether and acetone. It is fairly soluble in alcohol and water, and is very soluble in acetic acid. It is soluble in sodium carbonate and sodium hydroxide solution. The following structural formula represents the compound:

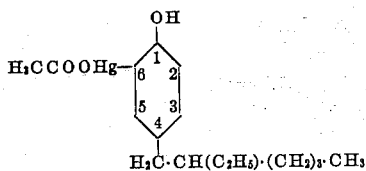

6-acetoxy-mercuri-4-(β-ethyl hexyl)-phenol-2-sulphonic acid.

Having described our invention, what we claim is:

1. A new water-soluble organo-mercuri compound, 6-acetoxy-mercury-4-(β-ethyl hexyl)-phenol-2-sulphonic acid, in which one bond of the mercury is attached directly to a carbon atom on the benzene nucleus, and the remaining bond attached directly to an acetoxy radical.

2. A new water-soluble organo-mercuri compound, mono-acetoxy-mercuri-n-heptyl-phenol sulphonic acid, in which one bond of the mercury is attached directly to a carbon atom on the benzene nucleus, and the remaining bond attached directly to an acetoxy radical.

3. A new water-soluble organo-mercuri compound, mono-acetoxy-mercuri-hexyl-phenol sulphonic acid, in which one bond of the mercury is attached directly to a carbon atom on the benzene nucleus, and the remaining bond attached directly to an acetoxy radical.

4. A new water-soluble and germicidal compound, mono-acetoxy-mercuri-alkyl phenol sulphonic acid, in which the alkyl radical has from 4 to 9 carbon atoms and is substituted in the para position to the phenol group, and in which one bond of the mercury is attached directly to a carbon atom in a position ortho to the phenol group on the benzene nucleus, and the remaining bond of the mercury being attached directly to an acetoxy radical, and the sulphonic acid radical substituted in the remaining ortho position to the phenol group, according to the following formula:

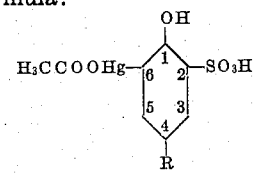

in which R represents an alkyl radical having from 4 to 9 carbon atoms.

EMIL CONRAD FANTO.
ALLEN LLEWELLYN OMOHUNDRO.